(12) United States Patent
Koshi (10) Patent No.: US 6,796,145 B2
(45) Date of Patent: Sep. 28, 2004

(54) METHOD FOR CUTTING MOTHER ROD LENS

(75) Inventor: Hiroshi Koshi, Osaki (JP)

(73) Assignee: Nippon Sheet Glass Co., LTD, Osaka (JP)

( * ) Notice: Subject to any disclaimer, the term of this patent is extended or adjusted under 35 U.S.C. 154(b) by 364 days.

(21) Appl. No.: 10/033,218

(22) Filed: Dec. 26, 2001

(65) Prior Publication Data

US 2002/0078806 A1 Jun. 27, 2002

(30) Foreign Application Priority Data

Dec. 27, 2000 (JP) .......................................... 2000-398572
Jun. 5, 2001 (JP) .......................................... 2001-169868

(51) Int. Cl.$^7$ ................................................ C03B 33/06
(52) U.S. Cl. ........................ 65/29.18; 65/105; 65/112; 83/36; 83/522.17; 83/473
(58) Field of Search .............................. 65/29.18, 105, 65/111, 112, 408, 409; 83/36, 13, 56, 522.17, 522.26, 473; 125/39

(56) References Cited

U.S. PATENT DOCUMENTS

| | | | | |
|---|---|---|---|---|
| 2,436,819 A | * | 3/1948 | Neidorf ........................ 451/41 |
| 2,964,443 A | * | 12/1960 | Dereich ........................ 156/298 |
| 3,247,589 A | * | 4/1966 | Burns ........................... 29/424 |
| 3,918,216 A | * | 11/1975 | Best et al. ..................... 451/41 |
| 4,084,308 A | * | 4/1978 | Runge ........................ 29/527.2 |
| 4,760,672 A | * | 8/1988 | Darcangelo et al. .......... 451/42 |
| 5,528,724 A | * | 6/1996 | Chang et al. ................ 385/137 |
| 6,634,933 B2 | * | 10/2003 | Koshi et al. .................. 451/42 |

* cited by examiner

*Primary Examiner*—Steven P. Griffin
*Assistant Examiner*—Carlos Lopez
(74) *Attorney, Agent, or Firm*—Marsh Fischmann & Breyfogle LLP (57) ABSTRACT

A method that accurately cuts mother rod lenses and increases production yield. The method includes arranging the mother rod lenses such that the optical axes of the mother rod lenses are parallel to one another, forming a lens block having perpendicular first and second side surfaces to integrally hold the predetermined mother rod lenses, arranging the lens block at a predetermined position, emitting laser beams respectively toward the first and second side surfaces, receiving reflection lights of the laser beams with first and second screens, respectively, adjusting the perpendicularity of the side surfaces relative to a cutting surface of the cutter such that the reflection lights of the side surfaces hit base positions on the first and second screen, and cutting the lens block and the mother rod lenses with the cutter to produce a plurality of rod lenses.

11 Claims, 4 Drawing Sheets

METHOD FOR CUTTING MOTHER ROD LENS

BACKGROUND OF THE INVENTION

The present invention relates to a method for cutting a mother rod lens and to a lens block for supporting a mother rod lens. More particularly, the present invention relates to a method for cutting a mother rod lens, which has a predetermined gradient index, into rod lenses having predetermined lengths.

In the prior art, to manufacture a gradient index rod lens, an elongated mother rod lens having a predetermined gradient index is cut into rod lenses having a predetermined length in accordance with the purpose of usage. Each end surface of a cut rod lens must be formed at a predetermined angle relative to the optical axis of the rod lens. The end surface of the rod lens may be formed so that it is basically perpendicular to the optical axis of the rod lens. Alternatively, the end surface of the rod lens may be inclined relative to the optical axis to decrease reflection loss.

Further, in the prior art, a single mother rod lens is cut to form rod lenses, which have predetermined lengths, one at a time. Therefore, the manufacturing efficiency of the rod lens is low. Further, if the accuracy of perpendicularity between the optical axis of the mother rod lens and the cut surface of the rod lens is low, the optical capabilities of the rod lens may decrease and the difference in lens characteristic between rod lenses may increase. This may decrease the yield of the rod lenses.

SUMMARY OF THE INVENTION

It is an object of the present invention to provide a method for cutting a mother rod lens and a lens block for supporting a mother rod lens that increases manufacturing efficiency and increases yield through highly accurate cutting.

To achieve the above object, the present invention provides a method for cutting a plurality of mother rod lenses having a predetermined gradient index with a cutter. The method includes arranging the mother rod lenses, each having an optical axis, such that the optical axes of the mother rod lenses are parallel to one another, and forming a lens block for holding the mother rod lenses. The lens block has a first side surface and a second side surface. The first and second side surfaces are arranged parallel to the optical axes and at a predetermined angle with respect to each other. The method further includes arranging the lens block at a predetermined position, emitting laser beams respectively toward the first and second side surfaces, receiving reflection lights of the laser beams reflected by the first and second side surfaces with first and second screens, respectively, adjusting the perpendicularity of the first side surface relative to a predetermined cutting surface of the cutter such that the reflection light of the first side surface hits a first base position on the first screen, adjusting the perpendicularity of the second side surface relative to the predetermined cutting surface such that the reflection light of the second side surface hits a second base position on the second screen, and cutting the lens block and the mother rod lenses with the cutter to produce a plurality of rod lenses having a predetermined length.

A further perspective of the present invention is a method for cutting a plurality of mother rod lenses having a predetermined gradient index with a cutter. The method includes arranging the mother rod lenses, each having an optical axis, such that the optical axes of the mother rod lenses are parallel to one another, and forming a lens block for holding the mother rod lenses. The lens block has an outer surface parallel to the optical axes. A first flat surface reflection body and a second flat surface reflection body are arranged on the outer surface separated from each other by a predetermined distance. The method further includes arranging the lens block at a predetermined position, emitting laser beams respectively toward the first and second flat surface reflection bodies, receiving reflection lights of the laser beams reflected by the first and second flat surface reflection bodies with first and second screens, respectively, adjusting the perpendicularity of the first flat surface reflection body relative to a predetermined cutting surface of the cutter such that the reflection light of the first flat surface reflection body hits a first base position on the first screen, adjusting the perpendicularity of the second flat surface reflection body relative to the predetermined cutting surface such that the reflection light of the second flat surface reflection body hits a second base position on the second screen, and cutting the lens block and the mother rod lenses with the cutter to produce a plurality of rod lenses having a predetermined length.

A further perspective of the present invention is a lens block for holding a plurality of mother rod lenses having a predetermined gradient index to cut the mother rod lenses with a cutter. The lens block includes a holding frame for holding the mother rod lenses, each having an optical axis, such that the optical axes of the mother rod lenses are parallel to one another. The holding frame has two side surfaces arranged parallel to the optical axes and at a predetermined angle with respect to each other. The holding frame and the mother rod lenses are integrated with each other by a resin.

A further perspective of the present invention is a lens block for holding a plurality of mother rod lenses having a predetermined gradient index to cut the mother rod lenses with a cutter. The lens block includes a holding frame for holding the mother rod lenses, each having an optical axis, such that the optical axes of the mother rod lenses are parallel to one another. The holding frame has an outer surface parallel to the optical axes. The holding frame and the mother rod lenses are integrated with each other by a resin.

A further perspective of the present invention is a lens block for holding a plurality of mother rod lenses having a predetermined gradient index to cut the mother rod lenses with a cutter. The lens block includes a plurality of cylindrical dummy glass rods, each having a center axis, and a holding frame for holding the dummy glass rods such that the center axes of the mother rod lenses are parallel to one another. The holding frame has two side surfaces arranged parallel to the center axes and at a predetermined angle with respect to each other. The mother rod lenses each have a diameter smaller than the diameter of the dummy glass rods. The mother rod lenses are held between the dummy glass rods and the holding frame such that the optical axes of the mother rod lenses are parallel to one another. The holding frame, the dummy glass rods, and the mother rod lenses are integrated with each other by a resin.

A further perspective of the present invention is a lens block for holding a plurality of mother rod lenses having a predetermined gradient index to cut the mother rod lenses with a cutter. The lens block includes a plurality of cylindrical dummy glass rods, each having a center axis, and a holding frame for holding the dummy glass rods such that the center axes of the mother rod lenses are parallel to one another. The holding frame has an outer surface parallel to the center axes. The mother rod lenses each have a diameter smaller than the diameter of the dummy glass rods. The mother rod lens is held between the dummy glass rods and the holding frame such that the optical axes of the mother rod lenses are parallel to one another. The holding frame, the dummy glass rods, and the mother rod lenses are integrated with each other by a resin.

A further perspective of the present invention is a cutting apparatus for cutting a plurality of mother rod lenses held by a lens block. The lens block has a first side surface and a second side surface arranged at a predetermined angle relative to each other. The apparatus includes a cutting machine for cutting the lens block along a predetermined cutting surface. A laser beam source emits laser beams toward the first and second side surfaces. A first screen and a second screen receive reflection lights of the laser beams reflected by the first and second side surfaces, respectively. The first screen has a first base line hit by the reflection light of the laser beam reflected by the first side surface when the first side surface is perpendicular to the predetermined cutting surface. The second screen has a second base line hit by the reflection light of the laser beam reflected by the second side surface when the second side surface is perpendicular to the predetermined cutting surface.

A further perspective of the present invention is a cutting apparatus for cutting a plurality of mother rod lenses held by a lens block. The lens block has an outer surface including a first flat surface reflection body and a second flat surface reflection body separated from each other by a predetermined distance. The apparatus includes a cutting machine for cutting the lens block along a predetermined cutting surface. A laser beam source emits laser beams toward a first side surface and a second side surface. A first screen and a second screen receive reflection lights of the laser beams are reflected by the first and second flat surface reflection bodies, respectively. The first screen has a first base line hit by the reflection light of the laser beam reflected by the first flat surface reflection body when the first flat surface reflection body is perpendicular to the predetermined cutting surface. The second screen has a second base line hit by the reflection light of the laser beam reflected by the second flat surface reflection body when the second flat surface reflection body is perpendicular to the predetermined cutting surface.

A further perspective of the present invention is a method for positioning a lens block holding a plurality of mother rod lenses to cut a plurality of mother rod lenses with a cutter. The lens block includes a holding frame for holding the mother rod lenses, each having an optical axis, such that the optical axes of the mother rod lenses are parallel to one another. The holding frame includes a first side surface and a second side surface arranged parallel to the optical axes and at a predetermined angle relative to each other. The method includes arranging the lens block at a predetermined position, emitting laser beams respectively toward the first and second side surfaces, receiving reflection lights of the laser beams reflected by the first and second side surfaces with first and second screens, respectively, adjusting the perpendicularity of the first side surface relative to a predetermined cutting surface of the cutter such that the reflection light of the first side surface hits a first base position on the first screen, and adjusting the perpendicularity of the second side surface relative to the predetermined cutting surface such that the reflection light of the second side surface hits a second base position on the second screen.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

First Embodiment

Figure 1:
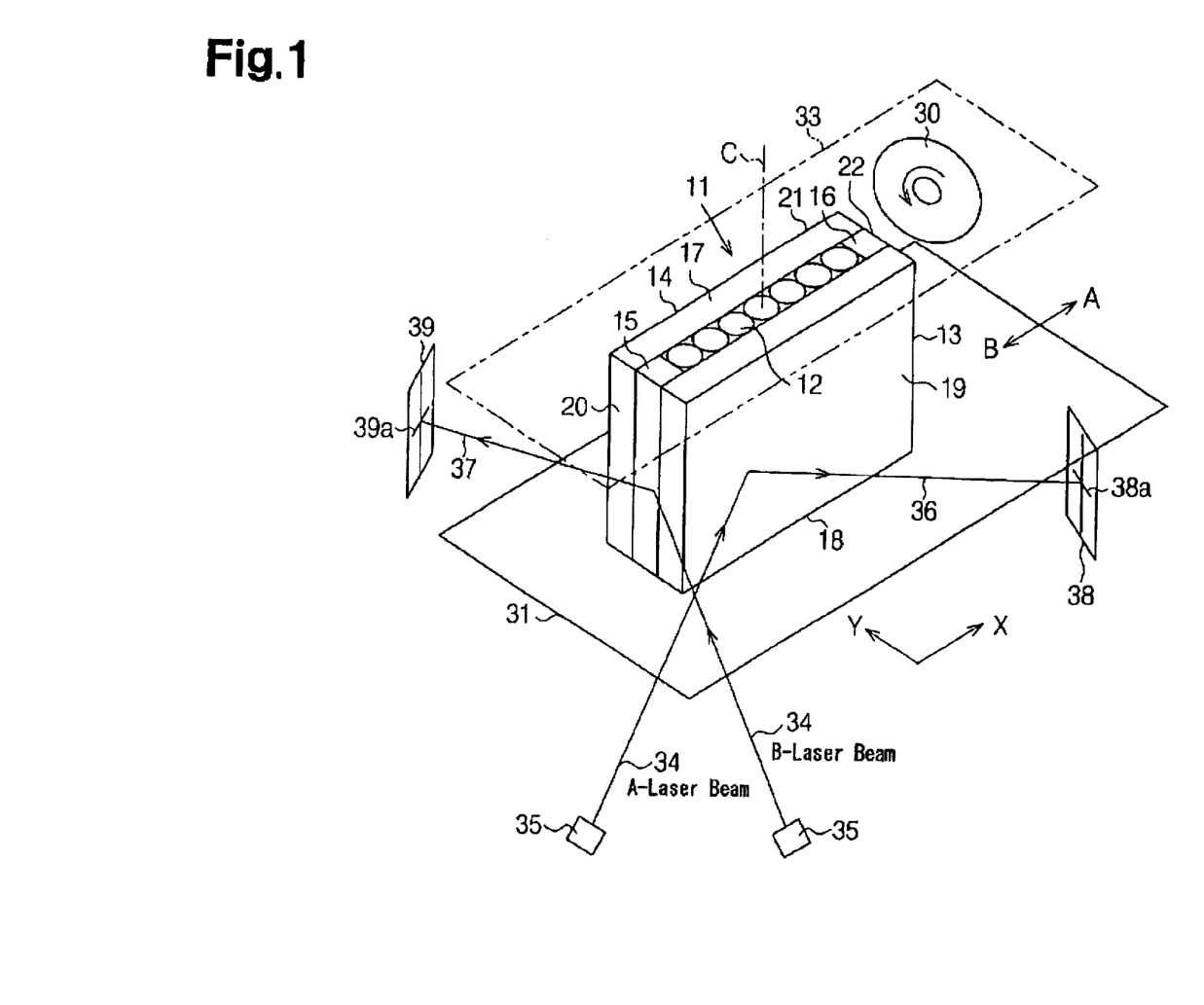
FIG. 1 is an explanatory diagram illustrating a method for cutting a mother rod lens according to a first embodiment of the present invention.
Figure 4:
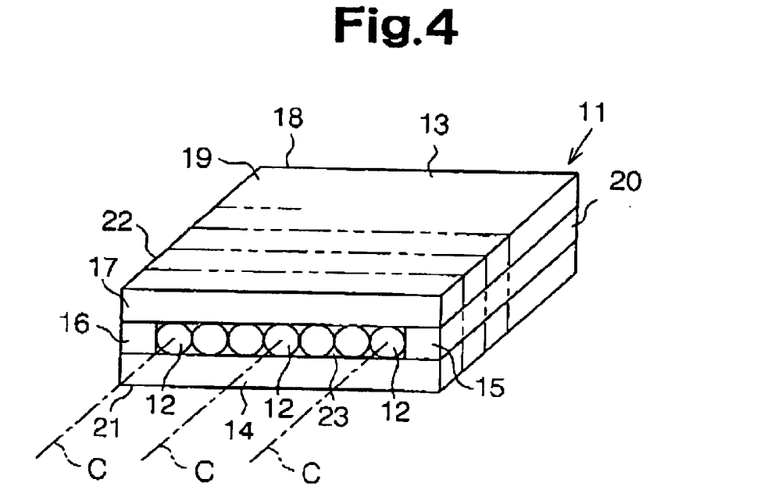
FIG. 4 is a perspective view showing a lens block used in the cutting method of FIG. 1.

FIG. 1 is an explanatory diagram illustrating a method for cutting a mother rod lens 12 according to a first embodiment of the present invention. A lens block 11, which is shown in FIG. 1, will now be described with reference to

FIG. 4.

The lens block 11 includes two main glass plates 13, 14 and two side glass plates 15, 16. The main glass plates 13, 14 and the side glass plates 15, 16 surround a plurality (seven in the first embodiment) of cylindrical mother rod lenses 12. The mother rod lenses 12 each have a predetermined gradient index and are arranged along a single row so that the optical axes C of the mother rod lenses 12 are parallel to one another.

The main glass plates 13, 14 and the side glass plates 15, 16 form a rectangular parallelepiped and holds seven mother rod lenses 12. The rectangular parallelepiped includes two end surfaces 17, 18 and four side surfaces 19, 20, 21, and 22, which are parallel to the optical axes C.

The main glass plates 13r 14, the side glass plates 15, 16, and the mother rod lenses 12 are integrated with one another by wax (resin) 23. The wax 23 easily softens when heated.

A cutting apparatus 100 used in a cutting method of the first embodiment will now be described with reference to FIGS. 1 and 3.

The cutting apparatus 100 includes a cutting machine 32, a laser beam source 35, a first (X axis direction) screen 38, and a second (Y axis direction) screen 39. The cutting machine 32 includes a cutter 30, and a surface plate 31, on which the lens block 11 is arranged. As shown in FIG. 3, the cutting apparatus 100 includes a coolant supplying device 70 for supplying coolant to the cutter 30.

The inclination of the surface plate 31 relative to a predetermined cutting surface 33 that would be formed by the cutter 30 is adjustable. The inclination of the surface plate 31 is adjusted relative to the predetermined cutting surface 33 in the X and Y axis directions. The lens block 11 is arranged on the surface plate 31 so that the end surface 18 of the lens block 11 contacts the surface plate 31.

The laser beam source 35 emits laser beams 34 toward two of the four side surfaces 19–22 that are perpendicular to each other (in FIG. 1, the first side surface 19 and the second side surface 20). The first screen 38 receives a reflection light 36 of the laser beam 34 reflected by the side surface 19. The second screen 39 receives a reflection light 37 of the laser beam 34 reflected by the side surface 20.

The lens block 11, which has long sides with a length of about 5 cm, is shown in an enlarged state in FIG. 1. For the sake of convenience, the laser beams 34, which are actually emitted from a single laser beam source 35, are shown separated into an A-laser beam and a B-laser beam. Further, to facilitate understanding, the first side surface 19 of the lens block 11 irradiated by the A-laser beam is referred to as an A-surface, and the second side surface 20 irradiated by the B-laser beam is referred to as a B-surface. The angle of incidence of the A-laser beam and the B-laser beam with respect to the corresponding A-surface 19 and B-surface 20 is about 45°.

A base line 38a, which serves as a base position, is impressed on the first screen 38 at a position where the reflection light 36 of the A-laser beam hits the first screen 38 when the A-surface 19 is perpendicular to the predetermined cutting surface 33. In the same manner, a base line 39a, which serves as a base position, is impressed on the second screen 39 at a position where the reflection light 37 of the B-laser beam hits the second screen 39 when the B-surface 20 is perpendicular to the predetermined cutting surface 33.

A method for cutting a mother rod lens according to the first embodiment will now be described with reference to FIGS. 1 and 2. The method includes the following steps A–F.

(A) The lens block 11 of FIG. 4 is first formed.

(B) Then, the lens block 11 is arranged on the surface plate 31 such that the end surface 18 of the lens block 11 contacts the surface plate 31. In this state, the A-laser beam and the B-laser beam are emitted toward the corresponding A-surface 19 and the B-surface 20, which are perpendicular to each other.

(C) The first screen 38 receives the reflection light 36 of the A-laser beam, and the second screen 39 receives the reflection light 37 of the B-laser beam.

(D) The perpendicularity of the A-surface 19 relative to the predetermined cutting surface 33 is adjusted by inclining the surface plate 31 by a predetermined amount so that the reflection light 36 hits the base line 38a.

The perpendicularity of the A-surface 19 is adjusted in the following manner.

Figure 2A:
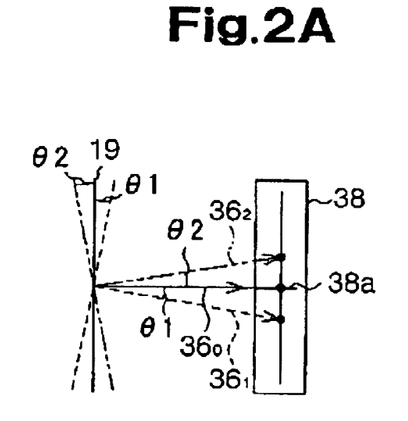
FIGS. 2A and 2B are explanatory diagrams illustrating the adjustment of perpendicularity in the cutting method of FIG. 1.

When the A-surface 19 is perpendicular to the predetermined cutting surface 33, the reflection light $36_0$ of the A-laser beam (laser beam 34) reflected by the A-surface 19 hits the base line 38a of the first screen 38, as shown by the solid line in FIG. 2A. When the A-surface 19 is inclined downward by angle θ1 relative to the predetermined cutting surface 33, the reflection light $36_1$, is oriented downward by angle θ1 such that the reflection light $36_1$ hits the first screen 38 at a position lower than the base line 38a, as shown by the broken line in FIG. 2A.

When the A-surface 19 is inclined upward by angle θ2 relative to the predetermined cutting surface 33, the reflection light $36_2$ is oriented upward by angle θ2 such that the reflection light $36_0$ hits the first screen 38 at a position higher than the base line 38a.

Accordingly, the position of the reflection light 36 on the first screen 38 is monitored to adjust the perpendicularity of the A-surface 19 relative to the predetermined cutting surface 33 such that the reflection light 36 hits the base line 38a.

(E) The perpendicularity of the B-surface 20 relative to the predetermined cutting surface 33 is adjusted by inclining the surface plate 31 such that the reflection light 37 hits the base line 39a.

The perpendicularity of the B-surface 20 is adjusted in the following manner.

Figure 2B:
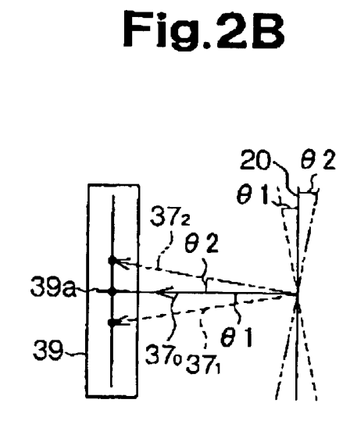

When the B-surface 20 is perpendicular to the predetermined cutting surface 33, the reflection light $37_0$ of the B-laser beam (laser beam 34) reflected by the B-surface 20 hits the base line 39a of the second screen 39, as shown by the solid line in FIG. 2B. When the B-surface 20 is inclined downward by angle θ1 relative to the predetermined cutting surface 33, the reflection light $37_1$ is oriented downward by angle θ1 such that the reflection light $37_1$ hits the second screen 39 at a position lower than the base line 39a, as shown by the broken line in FIG. 2B. When the B-surface 20 is inclined upward by angle θ2 relative to the predetermined cutting surface 33, the reflection light $37_2$ is oriented upward by angle θ2 such that the reflection light $37_0$ hits the second screen 39 at a position higher than the base line 39a.

Accordingly, the position of the reflection light 37 on the second screen 39 is monitored to adjust the perpendicularity of the B-surface 20 relative to the predetermined cutting surface 33 such that the reflection light 37 hits the base line 39a.

(F) After adjusting the perpendicularity of the A-surface 19 and the B-surface 20 relative to the predetermined cutting surface 33, the cutter 30 sequentially cuts the lens block 11 into predetermined lengths (as shown by the broken lines in FIG. 4) In this state, the surface plate 31 is moved relative to the cutter 30 in the direction of arrow A in FIG. 1. After the first piece of the lens block 11 is cut, the surface plate 31 is moved by a predetermined distance in the direction of arrow B to return the lens block 11 to its original position and cut the next piece.

The polishing of a lens block piece 40 cut from the lens block 11 to have a predetermined length will now be described with reference to FIGS. 5 and 6.

Figure 5:
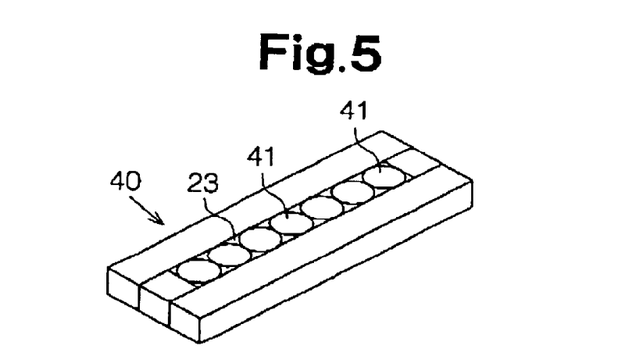
FIG. 5 is a perspective view showing a lens block piece cut from the lens block of FIG. 4.
Figure 6:
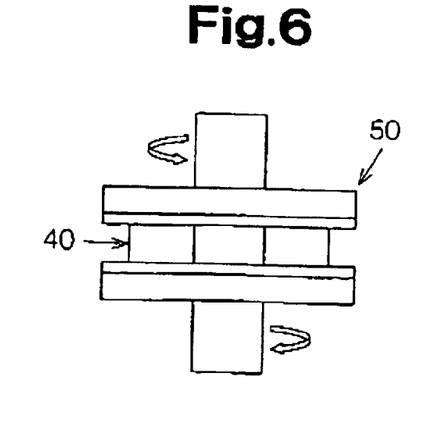
FIG. 6 is an explanatory diagram showing a polishing machine of the lens block piece of FIG. 5.

FIG. 5 shows the lens block piece 40, which is cut into a predetermined length. The lens block piece 40 includes seven rod lenses 41, each of which has a predetermined length.

Figure 3:
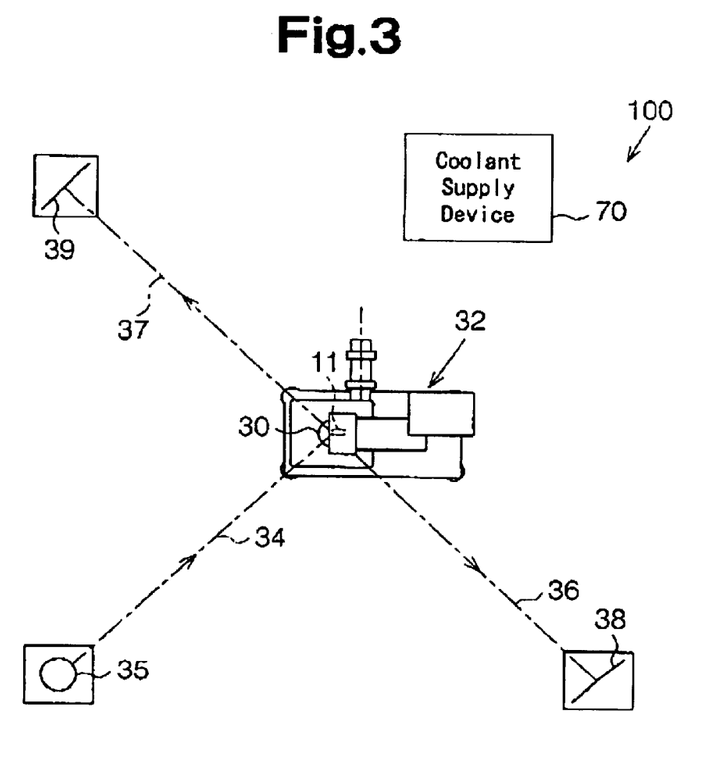
FIG. 3 is a schematic diagram illustrating the layout of a cutting apparatus used in the cutting method of FIG. 1.

The cutting machine 32 of FIG. 3 is an inner circumference blade cutting machine, and the cutter 30 of the cutting machine 32 is an annular diamond cutter. By cutting the lens block 11 with the diamond cutter 30, the seven mother rod lenses 12 are accurately cut. The cutting surface of each mother rod lens 12 has, for example, a roughness of Rmax 5 μm or less.

In the prior art, the cutting surface of the lens block is polished after rough grinding and sand blast grinding (fine grinding) the cutting surface. In comparison, the grinding processes are not performed in the preferred embodiment. More specifically, the lens block pieces 40 cut from the lens block 11 are polished by a polishing machine 50, which is shown in FIG. 6, without undergoing grinding. The polishing agent is, for example, an aqueous solution including cerium oxide.

After the polishing is performed, the wax 23 is heated and warmed to separate seven rod lenses 41 from the lens block piece 40. The rod lenses 41 are than washed to remove the wax 23 from the rod lenses 41. This completes the rod lenses 41, which have predetermined lengths.

The method for cutting mother rod lenses according to the first embodiment has the advantages described below.

The cutter 30 sequentially cuts the lens block 11, which holds seven mother rod lenses 12, into the lens block pieces 40, which have predetermined lengths. This produces seven rod lenses 41 at a time and improves the production efficiency of the rod lenses 41.

The inclinations of the A-surface 19 and the B-surface 20 relative to the predetermined cutting surface 33 are each adjusted so that the reflection lights 36, 37 from the side surfaces 19, 20 of the lens block 11 hits the base lines 38a, 39a of the first and second screens 38, 39, respectively. Thus, the perpendicularity between the optical axis C of each mother rod lens 12 and the predetermined cutting surface 33 is easily and accurately set.

The single laser beam source 35 emits the laser beams 34 toward the first side surface 19 and the second side surface 20, which are perpendicular to each other among the four side surfaces 19–22 of the lens block 11. Accordingly, only one laser beam source 35 is required to emit laser beams toward the side surfaces 19, 20. This reduces the cost of the cutting apparatus 100.

In the lens block 11, the seven mother rod lenses 12, the two main glass plates 13, 14, and the two side glass plates 15, 16 are integrated with each other by the wax 23. Thus, when the seven mother rod lenses 12 are cut, each mother rod lens 12 is held in a fixed state in the lens block 11. This prevents differences in the cutting surface accuracy of each mother rod lens 12 from being produced. In other words, differences in the angle (e.g., perpendicularity) of the cutting surface of each rod lens relative to the optical axis C does not occur.

Second Embodiment

Figure 7:
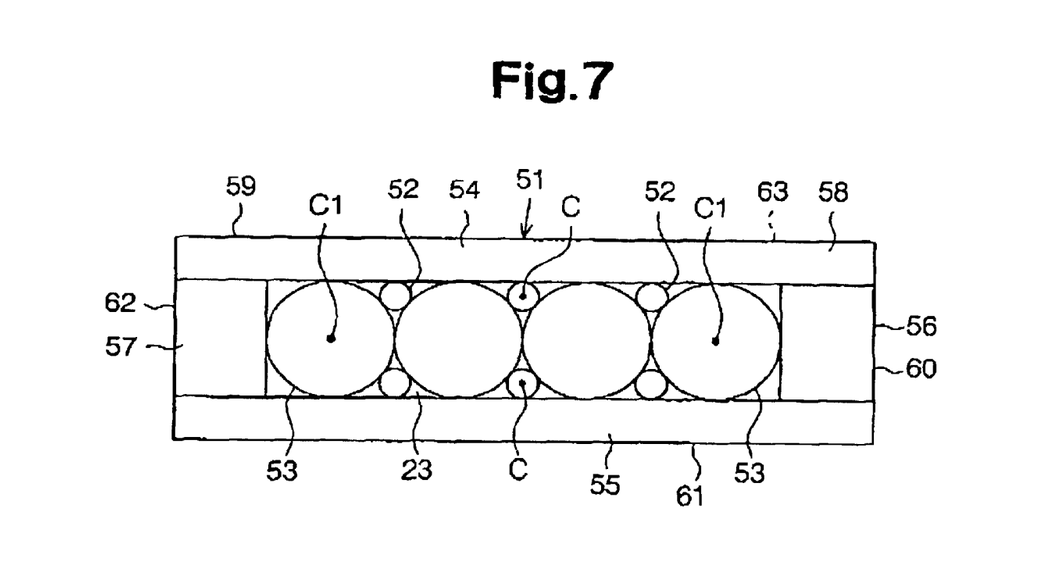
FIG. 7 is a front view showing a lens block according to a second embodiment of the present invention.

A lens block 51 according to a second embodiment of the present invention will now be described with reference to FIG. 7. The lens block 51 is cut using the cutting method of the first embodiment.

The lens block 51 includes two main glass plates 54, 55 and two side glass plates 56, 57. The main glass plates 54, 55 and the side glass plates 56, 57 hold a plurality of (four in the second embodiment) dummy glass rods 53. The dummy glass rods 53 are arranged along a row so that the center axes C1 of the dummy glass rods 53 are parallel to one another.

The main glass plates 54, 55 and the side glass plates 56, 57 are arranged to form a rectangular parallelepiped. The lens block 51 includes two end surfaces 58 (only one of the end surfaces is shown in FIG. 7), which are perpendicular to the optical axes C of mother rod lenses 52, and side surfaces 59, 60, 61, and 62, which are parallel to the optical axes C.

The lens block 51 also includes a plurality of (six in the second embodiment) the mother rod lenses 52, each of which has a diameter smaller than that of the dummy glass rods 53 and each of which has a predetermined gradient index. The six mother rod lenses 52 are held between the four dummy glass rods 53 and the main glass plates 54, 55 so that the optical axes C of the mother rod lenses 52 are parallel to one another. The main glass plates 54, 55, the side glass plates 56, 57, the four dummy glass rods 53, and the six mother rod lenses 52 are integrated with one another by wax 23.

The lens block 51 of the second embodiment has the advantages described below.

The six mother rod lenses 52, the diameter of which is smaller than that of the dummy glass rods 53, are held between the four dummy glass rods 53 and the main glass plates 54, 55 so that the optical axes C of the mother rod lenses 52 are parallel to one another. The main glass plates 54, 55, the side glass plates 56, 57, the tour dummy glass rods 53, and the six mother rod lenses 52 are integrated with one another by wax 23. Accordingly, the mother rod lenses 52 are held in a fixed state when cut even if the diameter of the mother rod lenses 52 is small, such as less than one millimeter. This prevents differences between the cutting surfaces of the mother rod lenses 52.

It should be apparent to those skilled in the art that the present invention may be embodied in many other specific forms without departing from the spirit or scope of the invention. Particularly, it should be understood that the present invention may be embodied in the following forms.

In the first embodiment, laser beams may be emitted to the two side surfaces 19, 20 from two laser beam sources.

In the first embodiment, after adjusting the perpendicularity of the two side surfaces 19, 20 relative to the predetermined cutting surface 33, one of the side surfaces 19, 20 may be inclined by a predetermined angle relative to the predetermined cutting surface 33. In this state, the lens block 11 may be cut. This easily, efficiently, and accurately manufactures rod lenses having end surfaces that are parallel to each other and inclined by a predetermined angle relative to the optical axes C.

Figure 8:
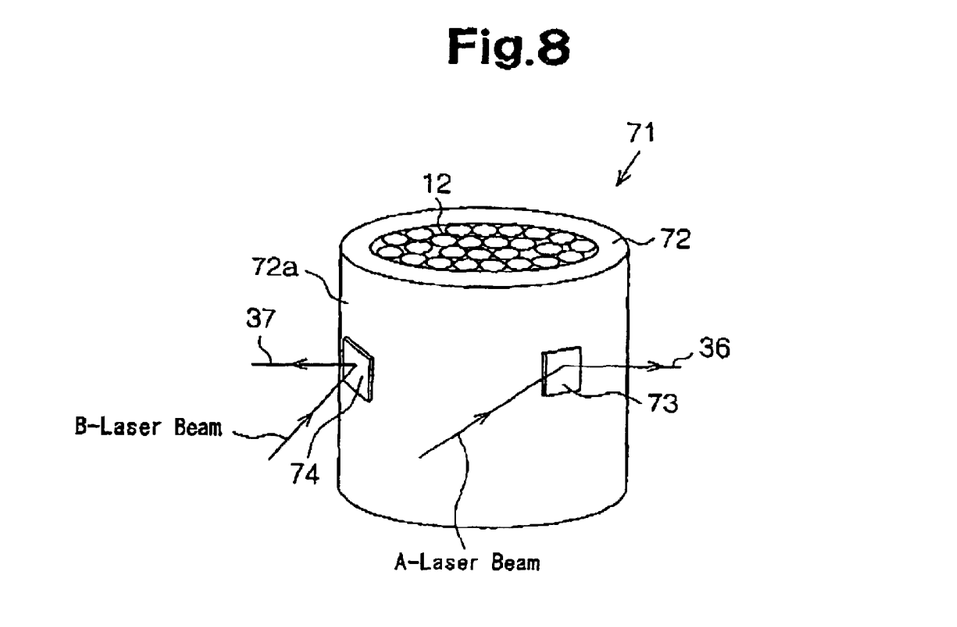
FIG. 8 is a perspective view showing a modification of the first embodiment.

In the first embodiment, as shown in FIG. 8, a lens block 71 may be formed by a cylindrical glass pipe (holding frame) 72. In this state, a plurality of the mother rod lenses 12 are arranged in the cylindrical space in the glass pipe 72 so that the optical axes C of the mother rod lenses 12 are parallel to one another. Further, the cylindrical outer surface of the glass pipe 72 is parallel to the optical axes C of the mother rod lenses 12.

In this case, as shown in FIG. 8, compact first and second flat surface reflection mirrors 73, 74 are fixed to the cylindrical outer surface of the glass pipe 72 separated from each other by a predetermined distance. The A-laser beam and the B-laser beam are emitted toward the two reflection mirrors 73, 74, respectively. The perpendicularity of the cylindrical outer surface glass pipe 72 relative to the predetermined cutting surface 33 is adjusted so that the reflection lights 36, 37 of the A-laser beam and the B-laser beam reflected by the reflection mirrors 73, 74 hits the base lines 38a, 39a on the screens 38, 39, respectively.

In the first embodiment, a base mark may be provided on the screens 38, 39 in lieu of the base lines 38a, 39a.

In the first embodiment, the cutting machine 32 is not limited to an inner circumference blade cutting machine.

In the first embodiment, when the lens block 11 is cut, the lens block 11 may be held by a chuck.

In the first embodiment, the lens block 11 may be formed by two members or three members to hold the mother rod lenses 12.

In the first embodiment, the lens block 11 may hold a plurality of mother rod lenses 12 arranged in two or more rows.

The lens blocks 11, 51 may have three side surfaces, five side surfaces, or more side surfaces.

The present examples and embodiments are to be considered as illustrative and not restrictive, and the invention is not to be limited to the details given herein, but may be modified within the scope and equivalence of the appended claims.

What is claimed is:

1. A method for cutting a plurality of mother rod lenses having a predetermined gradient index with a cutter, the method comprising the steps of:

arranging the mother rod lenses, each having an optical axis, such that the optical axes of the mother rod lenses are parallel to one another;

forming a lens block for holding the mother rod lenses, wherein the lens block has a first side surface and a second side surface, the first and second side surfaces being arranged parallel to the optical axes and at a predetermined angle with respect to each other;

arranging the lens block at a predetermined position;

emitting laser beams respectively toward the first and second side surfaces;

receiving reflection lights of the laser beams reflected by the first and second side surfaces with first and second screens, respectively;

adjusting the perpendicularity of the first side surface relative to a predetermined cutting surface of the cutter such that the reflection light of the first side surface hits a first base position on the first screen;

adjusting the perpendicularity of the second side surface relative to the predetermined cutting surface such that the reflection light of the second side surface hits a second base position on the second screen; and cutting the lens block and the mother rod lenses with the cutter to produce a plurality of rod lenses having a predetermined length.

2. The method according to claim 1, wherein the lens block is a rectangular parallelepiped, and wherein the rectangular parallelepiped has two end surfaces perpendicular to the optical axes and four side surfaces parallel to the optical axes, the four side surfaces including the first and second side surfaces.

3. The method according to claim 1, wherein the cutting step includes adjusting the perpendicularity of the first and second side surfaces of the lens block and then inclining one of the first and second side surfaces at a predetermined angle relative to the predetermined cutting surface to cut the lens block and the mother rod lenses.

4. The method according to claim 1, wherein the first and second side surfaces of the lens block are two adjacent side surfaces, and the laser beam emitting step includes emitting the laser beams toward the two adjacent side surfaces from a single laser beam source.

5. The method according to claim 1, wherein the cutting step includes cutting the lens block with a diamond cutter.

6. A method for cutting a plurality of mother rod lenses having a predetermined gradient index with a cutter, the method comprising the steps of:

arranging the mother rod lenses, each having an optical axis, such that the optical axes of the mother rod lenses are parallel to one another;

forming a lens block for holding the mother rod lenses, wherein the lens block has an outer surface parallel to the optical axes, and wherein a first flat surface reflection body and a second flat surface reflection body are arranged on the outer surface separated from each other by a predetermined distance;

arranging the lens block at a predetermined position;

emitting laser beams respectively toward the first and second flat surface reflection bodies;

receiving reflection lights of the laser beams reflected by the first and second flat surface reflection bodies with first and second screens, respectively;

adjusting the perpendicularity of the first flat surface reflection body relative to a predetermined cutting surface of the cutter such that the reflection light of the first flat surface reflection body hits a first base position on the first screen;

adjusting the perpendicularity of the second flat surface reflection body relative to the predetermined cutting surface such that the reflection light of the second flat surface reflection body hits a second base position on the second screen; and cutting the lens block and the mother rod lenses with the cutter to produce a plurality of rod lenses having a predetermined length.

7. The method according to claim 6, wherein the cutting step includes adjusting the perpendicularity of the first and second flat surface reflection bodies of the lens block and then inclining one of the two flat surface reflection bodies at a predetermined angle relative to predetermined the cutting surface to cut the lens block and the mother rod lenses.

8. The method according to claim 6, wherein the laser beam emitting step includes emitting the laser beams toward the two flat surface reflection bodies from a single laser beam source.

9. The method according to claim 6, wherein the cutting step includes cutting the lens block with a diamond cutter.

10. A method for positioning a lens block holding a plurality of mother rod lenses to cut a plurality of mother rod lenses with a cutter, wherein the lens block includes a holding frame for holding the mother rod lenses, each having an optical axis, such that the optical axes of the mother rod lenses are parallel to one another, the holding frame including a first side surface and a second side surface arranged parallel to the optical axes and at a predetermined angle relative to each other, the method comprising the steps of;

arranging the lens block at a predetermined position;

emitting laser beams respectively toward the first and second side surfaces;

receiving reflection lights of the laser beams reflected by the first and second side surfaces with first and second screens, respectively;

adjusting the perpendicularity of the first side surface relative to a predetermined cutting surface of the cutter such that the reflection light of the first side surface hits a first base position on the first screen; and adjusting the perpendicularity of the second side surface relative to the predetermined cutting surface such that the reflection light of the second side surface hits a second base position on the second screen.

11. The method according to claim 10, further comprising the method of:

adjusting the perpendicularity of the first and second side surfaces of the lens block and then inclining one of the first and second side surfaces at a predetermined angle relative to the predetermined cutting surface.

* * * * *

UNITED STATES PATENT AND TRADEMARK OFFICE
CERTIFICATE OF CORRECTION

PATENT NO.    : 6,796,145 B2
DATED         : September 28, 2004
INVENTOR(S)   : Koshi It is certified that error appears in the above-identified patent and that said Letters Patent is hereby corrected as shown below:

Title page,
Item [73], Inventor, delete "Osaki", and insert therefor -- Osaka --;
Item [73], Assignee, after "LTD", insert -- . --.

Signed and Sealed this

Eleventh Day of January, 2005

JON W. DUDAS
*Director of the United States Patent and Trademark Office*